May 2, 1967 W. T. COOPER 3,317,225
SUN-VISOR ATTACHMENT
Filed April 23, 1965
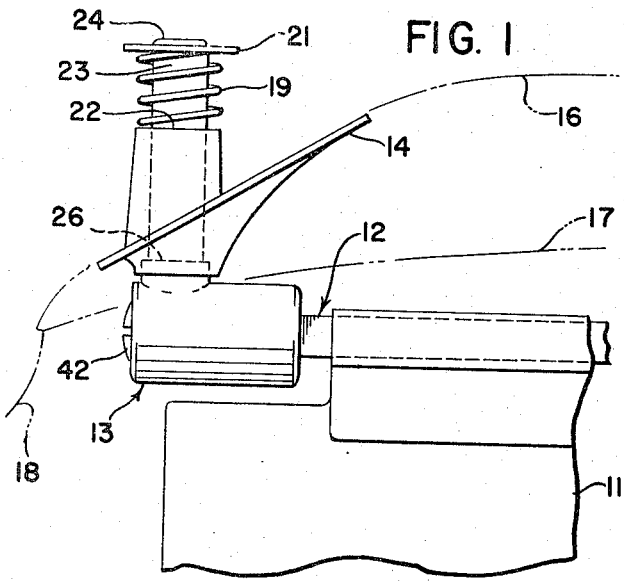
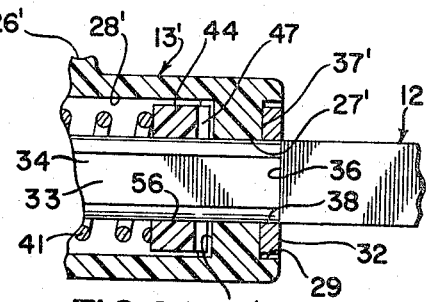
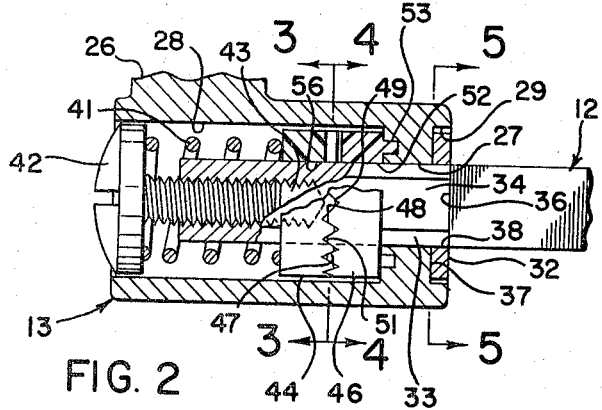
INVENTOR.
WILLIAM T. COOPER
BY
ATTORNEY 3,317,225
SUN-VISOR ATTACHMENT
William T. Cooper, 1724 Liberty Drive,
Akron, Ohio 44313
Filed Apr. 23, 1965, Ser. No. 450,482
1 Claim. (Cl. 287—14)

ABSTRACT OF THE DISCLOSURE

The sun visor is supported by a rod which extends into a bracket. The visor is held in position by intermeshing clutch parts. The rod which supports the visor enters one end of the bracket. The inner surface of this end of the bracket is roughened to form one clutch surface and the other clutch surface is on a part that surrounds the rod. The two clutch surfaces are pressed together at all times by a coil spring that surrounds the rod. No other parts are required.

The specification

This invention relates to a new arrangement for supporting a sun visor in an automobile.

The arrangement includes spring-pressed intermeshing serrated clutch parts which support the visor rod at any desired angular position. This position can be changed by separating the serrations against the spring pressure, rotating the visor rod to another position, and then allowing the spring to re-engage the serrations.

Whatever the position at which the disc serrations are engaged, the angle of the visor remains fixed until intentionally adjusted to a new angle. In this respect, the arrangement is preferred over the usual arrangement in which maintenance of the angle of the visor rod at any given angle is dependent upon friction, and the weight of the visor tends to cause the rod to twist and the visor to sag. With the improved arrangement the visor's position is positively maintained so that the visor may be used to support accessories attached thereto.

The invention is futher described in connection with the accompanying drawings, in which—

FIGURE 1 is a side elevation showing the visor lowered to one of the usual operating positions;

FIGURE 2 is a fragmentary enlargement of FIGURE 1, shown in section;

FIGURE 2A is a view similar to FIGURE 2 showing a modification;

FIGURES 3 to 5 are sections on lines 3—3, 4—4, and 5—5, respectively, of FIGURE 2; and FIGURE 6 is an exploded perspective view.

Referring to FIGURE 1, the sun visor 11 is preferably slidably mounted on a supporting rod 12 which usually is square. The supporting rod 12 is rotatably journaled in a bracket 13 pivotally mounted in a conventional mounting plate assembly. The mounting plate 14 is attached to the ceiling 16 of the vehicle in a conventional manner, usually at the apex of the windshield 17 and window frame 18. Compression is maintained on the bracket 13 by spring 19 to maintain the rod 12 in a preferred lateral position. Compression spring 19 is disposed between washer 21 and nipple 22 which is integral with mounting plate 14. The spring 19 surrounds a pivot stud 23 that is peened at 24 to retain washer 21 and at the opposite end is rigidly mounted to a boss 26, on bracket 13.

The cylindrical bracket 13 is provided with an aperture 27 at one end of the cylindrical cavity 28, in wall 37, and the exposed surface of this wall is countersunk at 29 by a depression with an off-round wall 29' which accommodates the bearing plate 32 and prevents its rotation. The aperture 27 is circular and does not interfere with rotation of the extension 33 which passes through it.

There is a circular opening 38 in the bearing plate through which the extension passes, the plate 32 being slidable on this extension. Shoulder 36 of rod 12 bears on the exterior surface of bearing plate 32. Pressure is maintained on bearing plate 32 by a compression spring 41 that may be adjusted with a suitable screw 42 threaded in a tapped blind bore 43 in extension 33. The spring 41 encircles the pin and the adjacent end of the extension 33.

The preferred clutch construction comprises two cooperating discs 44, 46 provided with opposing serrated teeth 47, 48. The tops 49, 51 of these teeth are preferably flat (as best shown in FIGURES 2 and 6) to facilitate the shifting of the respective teeth over one another, when desired. Disc 46 is provided with an aperture 52 (FIGURES 4 and 6) and is prevented from rotating in the bracket by integral studs 53 cooperating with one or more slots 54 provided in wall 37 of bracket 13. Disc 44 is provided with an aperture 56 that has flats 57 cooperating with flats 34 on said extension 33 and is held in engagement with said disc 46 by said spring 41.

The visor 11 is so attached to the rod 12 that the two always move together. Torsional rotation of rod 12 effected by manual movement of the visor 11, imparts a rotation to clutch disc 44 due to the flats 34 on extension 33 fitting against flats 57 in this disc. In this way the respective serrations are slidably rotated over one another, and when the torsion force is released, compression spring 41 returns disc 44 to its static locked position. The opposing serrations of the rotatable disc 44 (movable with extension 33) and non-rotatable disc 46 (fastened to the bracket), prohibit the rod 12 from rotating inadvertently due to vibrations or the placement of heavy accessories on the visor 11. The screw 42 rotates with rod 12 and is slightly smaller than cylindrical cavity 28 so that it moves freely within it.

Referring now to FIGURE 2A, identical parts have the same numbers, and similar parts are primed. The bracket 13 is provided with integral serrations 48' on wall 37' which mesh with serrations on disc 44, eliminating disc 46. Other serrated clutch arrangements may be employed.

The discs are advantageously molded from a plastic, such as nylon, Teflon or the like. The bracket, too, may be made of a plastic.

The invention is covered in the claim which follows.

What I claim is:

In an automobile provided with a sun visor mounted on a rod held by a bracket which is fastened to the automobile, the rod being rotatable in the bracket, and the visor being positioned by intermeshing clutch surfaces rounds the rod, the improvement in which one end of the rod enters one end of the bracket, one clutch surface is integral with said end of the bracket and exposed to the interior of the bracket, the other clutch surface is on a member slidable along the rod but not rotatable about it, and the spring presses said surfaces together at all times.

References Cited by the Examiner

UNITED STATES PATENTS

| 985,571 | 2/1911 | Cramer | 287—14 X |
| 1,781,545 | 11/1930 | Groenenstein | 248—293 |
| 2,279,542 | 4/1942 | Westrope | 296—97.92 |
| 3,119,591 | 1/1964 | Malecki | 287—14 X |
| 3,261,638 | 7/1966 | Weingarten | 287—14 X |

FOREIGN PATENTS

| 335,720 | 10/1930 | Great Britain. |
| 330,219 | 10/1935 | Italy. |

CARL W. TOMLIN, Primary Examiner.

W. L. SHEDD, T. A. LISLE, Assistant Examiners.